United States Patent [19]

Bahl et al.

[11] Patent Number: 4,565,847

[45] Date of Patent: Jan. 21, 1986

[54] BLENDS OF LLDPE, PP AND EPDM OR EPR FOR FILMS OF IMPROVED STIFFNESS, TEAR AND IMPACT STRENGTH

[75] Inventors: Surinder K. Bahl, West Windsor; Peter J. Canterino, Towaco; Richard G. Shaw, Bradley Beach, all of N.J.

[73] Assignee: Mobil Oil Corporation, New York, N.Y.

[21] Appl. No.: 568,016

[22] Filed: Jan. 4, 1984

[51] Int. Cl.[4] .................. C08L 23/20; C08L 23/16; C08L 23/12; C08L 23/24

[52] U.S. Cl. .................................... 525/240; 525/211

[58] Field of Search ........................ 525/211, 240

[56] References Cited

U.S. PATENT DOCUMENTS

| | | | |
|---|---|---|---|
| 3,254,139 | 5/1966 | Anderson et al. | 525/240 |
| 3,426,105 | 2/1969 | Christensen | 525/240 |
| 4,277,578 | 7/1981 | Yoshimura et al. | 525/211 |
| 4,426,498 | 1/1984 | Inoue et al. | 525/240 |

FOREIGN PATENT DOCUMENTS

| | | | |
|---|---|---|---|
| 52556 | 5/1982 | European Pat. Off. | 525/240 |
| 58-101135 | 6/1983 | Japan | 525/240 |

*Primary Examiner*—Carman J. Seccuro
*Attorney, Agent, or Firm*—Alexander J. McKillop; Michael G. Gilman; Edward J. Trojnar

[57] ABSTRACT

Polymeric blends comprising linear low density polyethylene (LLDPE) as the major constituent (60 percent or more), and polypropylene (PP) or ethylene-propylene copolymer having a high propylene content and ethylene-propylene-diene monomer rubber as minor constituents exhibit improved stiffness, tear and impact strength compared to blends of LLDPE and PP. The blends are suitable for use in films.

9 Claims, No Drawings

BLENDS OF LLDPE, PP AND EPDM OR EPR FOR FILMS OF IMPROVED STIFFNESS, TEAR AND IMPACT STRENGTH

BACKGROUND OF THE INVENTION

It is known that blends of linear low polyethylene (LLDPE) and polypropylene (PP) have improved stiffness (higher modulus) than LLDPE alone. Such blends exhibit a catastrophic decrease in impact and in tear strength, particularly in the machine direction (MD). We have found that LLDPE/PP blends containing minor amounts of an ethylene-propylene-diene monomer rubber (EPDM) or ethylene-propylene rubber (EPR) have the expected increase in stiffness along with unexpectedly improved MD Elmendorf tear and dart drop impact properties.

Certain blends of high pressure polyethylene, polypropylene and EPDM are described in U.S. Pat. No. 4,088,714 but these compositions contain a much higher EPDM content of (20 to 50 weight percent) than necessary in this invention.

BRIEF DESCRIPTION OF THE INVENTION

This invention relates to thermoplastic polymer blends comprising linear low density polyethylene (LLDPE), sufficient polypropylene (PP) to improve the stiffness (modulus) of the LLDPE and small amount of ethylene-propylene-diene monomer copolymer (EPDM) or ethylene-propylene rubber (EPR) sufficient to improve the tear strength and dart drop of the LLDPE/PP blend by at least 10 percent.

DETAILED DESCRIPTION OF THE INVENTION

The thermoplastic blends of this invention generally comprise 60 to 95 weight percent of a linear low density copolymer of ethylene and an olefin having 4 to 10 carbon atoms (LLDPE); 2 to 30 weight percent of polypropylene (PP); and up to about 10 weight percent of a ethylene-propylene-diene terpolymer (EPDM) or ethylene-propylene rubber (EPR) in an amount sufficient to improve the tear strength and the dart drop impact of the LLDPE/PP blend by at least 10 percent.

The amount of polypropylene is selected to achieve the desired stiffness (modulus) and the amount can vary somewhat depending on the alpha-olefin comonomer used to prepare the LLDPE, the melt index of the LLDPE and other factors.

Similarly, the amount of EPDM or EPR is selected to achieve the desired improvement in tear and impact strength and can vary depending on the nature of the LLDPE and the proportion of PP.

Preferred compositions comprise 85 to 95 weight percent of LLDPE; 5 to 15 weight percent PP; and 0.1 to 5 weight percent of EPDM or EPR.

The blends of this invention can be physical blends of pellets of the separate ingredient or melt blends. The blends in either case are intended to ultimate formation into articles such as films having the improved tear strength and impact strength which we have discovered.

The term linear low density polyethylene (LLDPE) as used herein refers to copolymers of ethylene and an alpha-olefin having 4 to 10 carbon atoms. Representative alpha-olefins include butene, hexene and octene. Generally, the LLDPE contains up to about 10 weight percent of polymerized alpha-olefin, has a density of 0.9 to 0.94 and a melt index of 0.2 to 10. The preparation of LLDPE is described in U.S. Pat. No. 4,076,698 which is incorporated herein by reference. LLDPE is also commercially available.

The term ethylene-propylene-diene monomer terpolymer (EPDM) as used in the specification and claims is used in the sense of its definition as found in ASTMD-1418-64 and is intended to mean terpolymers containing ethylene and propylene in the backbone and a diene in a side chain which results in an olefin. Illustrative methods for producing these terpolymers are found in U.S. Pat. No. 3,280,082. British Pat. No. 1,030,289 and French Pat. No. 1,386,600, incorporated herein by reference. The preferred polymers contain about 0.1 to about 20 weight percent of diene monomer, the balance of the polymer being ethylene and propylene. Preferably, the polymer contains about 0.1 to about 15 weight percent diene monomer, e.g., 3.3 weight percent. The diene monomer is a nonconjugated diene. The preferred nonconjugated diene monomers which may be used in the preparation of the terpolymer of this invention (EPDM) are hexadiene, dicyclopentadiene, ethylidene norbornene, methylene norbornene, propylidene norbornene and methyltetrahydroindene. Ethylene-propylene rubbers (EPR) are also commercially available. A suitable EPR is available from Exxon as Vistalon 719.

The polypropylene (PP) referred to herein includes any of the known homopolymers polymers of this class, as well as ethylene-propylene copolymers having a high propylene content which is generally above 90 weight percent. Ethylene-propylene copolymers with a propylene content of about 97 weight have been found to be suitable, many of which are commercially available. The polypropylene homopolymer or copolymer is selected for its ability to impart stiffness to the blend as shown by increased secant modulus. Accordingly, ethylene-propylene copolymers having a sufficient propylene content to impart the desired stiffness are useful in this invention.

The invention is illustrated by the following non-limiting example.

EXAMPLE

Films (1.5 mils.) were prepared from LLDPE, LLDPE/PP blend and from LLDPE/PP/EPDM blends in the indicated weight ratios. The films were measured for secant modulus, tear strength and dart drop impact as set forth in the Table below.

TABLE

| TYPE | WEIGHT RATIO | SECANT MODULUS (lb./sq. in.) | | TEAR STRENGTH (g/mil.) | | DART DROP IMPACT (grams) |
| --- | --- | --- | --- | --- | --- | --- |
| | | (MD) | (TD) | (MD) | (TD) | |
| LLDPE | 100 | 27400 | 27600 | 140 | 250 | 100 |
| LLDPE/PP | 90/10 | 40800 | 38800 | 65 | 185 | 60 |
| LLDPE/PP/EPDM | 90/9/1 | 45300 | 45300 | 105 | 215 | 160 |

The LLDPE employed is identified as GRSN 7042 available from Union Carbide and is a copolymer of ethylene with about 4 mole percent butene-1. It has a melt flow index of 2.0 grams/10 minutes and a density of 0.918 gm/cm$^3$. The PP was Arco W 472 polypropylene and the EPDM was Vistalon 1721 available from Exxon.

Although the present invention has been described with preferred embodiments, it is to be understood that modifications and variations can be restorted to without departing from the spirit and scope of this invention as those skilled in the art will readily understand. Such variations and modifications are considered to be within the purview and scope of the appended claims.

We claim:

1. A film of a thermoplastic blend comprising:
   60 to 95 weight percent of a linear low density copolymer of ethylene and an olefin having 4 to 10 carbon atoms (LLDPE);
   2 to 30 weight percent of polypropylene (PP) or propylene-ethylene copolymer with a high propylene content; and
   less than 2 weight percent of an ethylene-propylene-diene terpolymer (EPDM) in an amount sufficient to improve the MD tear strength of the LLDPE/PP blend by at least 10 percent.
2. The film of claim 1 in which said olefin is butene.
3. The film of claim 1 in which said olefin is hexene.
4. The film of claim 1 in which said olefin is octene.
5. The film of claim 1 comprising:
   85 to 95 weight percent of LLDPE;
   5 to 15 weight percent PP; and
   0.1 to less than 2 weight percent of EPDM.
6. The film of claim 1 in which said propylene polymer is polypropylene (PP).
7. The film of claim 2 in which said propylene polymer is polypropylene (PP).
8. The film of claim 3 in which said propylene polymer is polypropylene (PP).
9. The film of claim 4 in which said propylene polymer is polypropylene (PP).

* * * * *